(12) United States Patent
Rozenboim

(10) Patent No.: US 8,872,917 B1
(45) Date of Patent: *Oct. 28, 2014

(54) TAMPER-RESISTANT VIDEO SURVEILLANCE NETWORK

(71) Applicant: Leonid Rozenboim, Los Gatos, CA (US)

(72) Inventor: Leonid Rozenboim, Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/246,231

(22) Filed: Apr. 7, 2014

Related U.S. Application Data

(63) Continuation of application No. 12/762,933, filed on Apr. 19, 2010, now Pat. No. 8,723,952.

(60) Provisional application No. 61/257,002, filed on Nov. 1, 2009.

(51) Int. Cl.
*H04N 7/18* (2006.01)
*H04N 5/913* (2006.01)
*H04N 5/78* (2006.01)

(52) U.S. Cl.
CPC .............. *H04N 5/913* (2013.01); *H04N 5/78* (2013.01); *H04N 7/18* (2013.01); *H04N 2005/91307* (2013.01)
USPC .......................................... 348/143; 386/241

(58) Field of Classification Search
USPC .......................................... 348/143; 386/241
See application file for complete search history.

(56) References Cited

U.S. PATENT DOCUMENTS

| | | | |
|---|---|---|---|
| 5,638,119 A * | 6/1997 | Cornuejols | 348/229.1 |
| 6,211,907 B1 * | 4/2001 | Scaman et al. | 348/148 |
| 7,042,499 B1 * | 5/2006 | Kido et al. | 348/211.14 |
| 7,168,953 B1 * | 1/2007 | Poggio et al. | 434/185 |
| 2006/0133476 A1 * | 6/2006 | Page et al. | 375/240.01 |
| 2006/0181612 A1 * | 8/2006 | Lee et al. | 348/207.1 |
| 2007/0217501 A1 * | 9/2007 | Siemens et al. | 375/240.01 |

* cited by examiner

*Primary Examiner* — Waseem Ashraf
*Assistant Examiner* — Marie Georges Henry
(74) *Attorney, Agent, or Firm* — Bardmesser Law Group

(57) ABSTRACT

A network of surveillance digital video cameras is provided. Each camera records video data and provides the video recordings to other networked cameras as well as to a central video storage. The instantly created plurality of copies of surveillance video recordings adds a great degree of difficulty for attempts to eliminate all of the individual camera's recordings during a security breach. Each networked camera is equipped with its own integrated storage device capable of holding several hours of recorded video footage. The networked cameras can exchange copies video data and store it locally on integrated storages.

17 Claims, 7 Drawing Sheets

TAMPER-RESISTANT VIDEO SURVEILLANCE NETWORK

CROSS-REFERENCE TO RELATED APPLICATIONS

This application is a continuation of U.S. patent application Ser. No. 12/762,933, filed on Apr. 19, 2010, which claims priority to U.S. Provisional Patent Application No. 61/257,002, filed on Nov. 1, 2009, which are both incorporated by reference herein in their entirety.

BACKGROUND OF THE INVENTION

1. Field of the Invention

The present invention is related to methods of video surveillance and, in particular, to a network of video cameras with a centralized storage of video data.

2. Description of the Related Art

Video surveillance is currently one of the fastest growing applications of digital video and data networking. Video surveillance evolves from all-analog CCTV (Closed Circuit Tele-Vision) equipment to digital technologies providing higher efficiency and security gains. However, transitioning the entire system into the digital domain often comes at an enormous cost.

Typically, video surveillance systems employ mainstream TCP/IP and Ethernet data communications standards, allowing to find adequate digital equivalents to the past and present analog architectures and to take advantage of the added levels of versatility that digital technology offers. The digital surveillance systems improve upon the traditional systems architectures and provide additional improvement in the level of security.

Implementation of an all-digital video security system involves finding ways to improve the system usability and security while maintaining its affordability. Once a digital video system becomes a key component of a physical security of a site, it can no longer be assumed that anyone having physical access to the site may be granted access to the video system components, as is often the practice in traditional IT systems. A physical security system must be protected from tamper or sabotage without imposing additional expenses on its implementation.

One of the most obvious and well-known vulnerabilities of any security video system is the location and protection of the video recording equipment and the recording media. If an attacker gains access to the video recorders and is able to eliminate all recordings reflecting the incident in progress, it will not be possible to use those video recordings to investigate the incident or as evidence for prosecution. Unprotected access to a security video system can negate any reasons for the video system to be implemented in the first place. There are numerous examples of incidents, where the location of video recording equipment was known and accessible to the perpetrators, giving them an upper hand.

While installation of multiple recorders increases effectiveness of surveillance, a perpetrator armed with inside knowledge can find this added measure not insurmountable. The existence and location of the added recording equipment may be deduced by eavesdropping on the data traffic and following the cable conduits, when inside information is unavailable or incomplete. Therefore, an improved and more secure video surveillance system is needed.

The transition from analog video recording equipment to digital one, in itself, does not improve or reduce the system vulnerabilities. It is almost as easy to steal and destroy computer hard disks, as it was to misappropriate video tapes. There is, however, a potential improvement in digital video surveillance systems: compressed digital video is easier to transmit over distances without a significant degradation of quality in the process, which allows to record and store the same video recordings at multiple locations simultaneously.

Accordingly, there is a need in the art for a cost-effective and less vulnerable means of diversifying the location of the surveillance video recordings that would provide an additional protection of recorded video data. Such a system should also provide incremental increases in costs with added degree of security.

SUMMARY OF THE INVENTION

The present invention is related to methods of digital video surveillance and, in particular, to a network of digital video cameras, where each of these cameras is augmented with a local (for example, solid-state) data storage capability, in addition to or instead of centralized data storage for video.

The present invention provides a network of digital video cameras. Each camera records video data and provides the video recordings to other networked cameras as well as to a central video storage. The instantly created plurality of copies of surveillance video recordings adds a great degree of difficulty for attempts to eliminate all of the individual camera's recordings during a security breach. According to an exemplary embodiment, maintaining a network of video recorders inside a protected building is more easily affordable.

Utilization of wireless data network makes it more difficult to deduce the location of the recording devices by tracing the cable traffic. The exemplary embodiment consolidates the functionality of a digital video camera (i.e., an IP Camera) and the functionality of Networked Video Recorder (NVR) in a single device. This device automatically communicates with other similar devices on the same network to form a highly scalable and resilient peer-to-peer network of such video devices.

According to the exemplary embodiment, a stand-alone surveillance device is provided. This device can be a video or a photo camera that has both of the following elements: (a) network connection device (such as, a connector for wired Ethernet, Wi-Max or Wi-Fi) and (b) local storage for the acquired imagery. Both the connector and the local storage work concurrently to store the video data locally and at the same time to transmit the video data over the network to an external recorder. This novel approach allows for duplicating the video footage into multiple co-located camera-recorders for increasing effectiveness of security applications.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
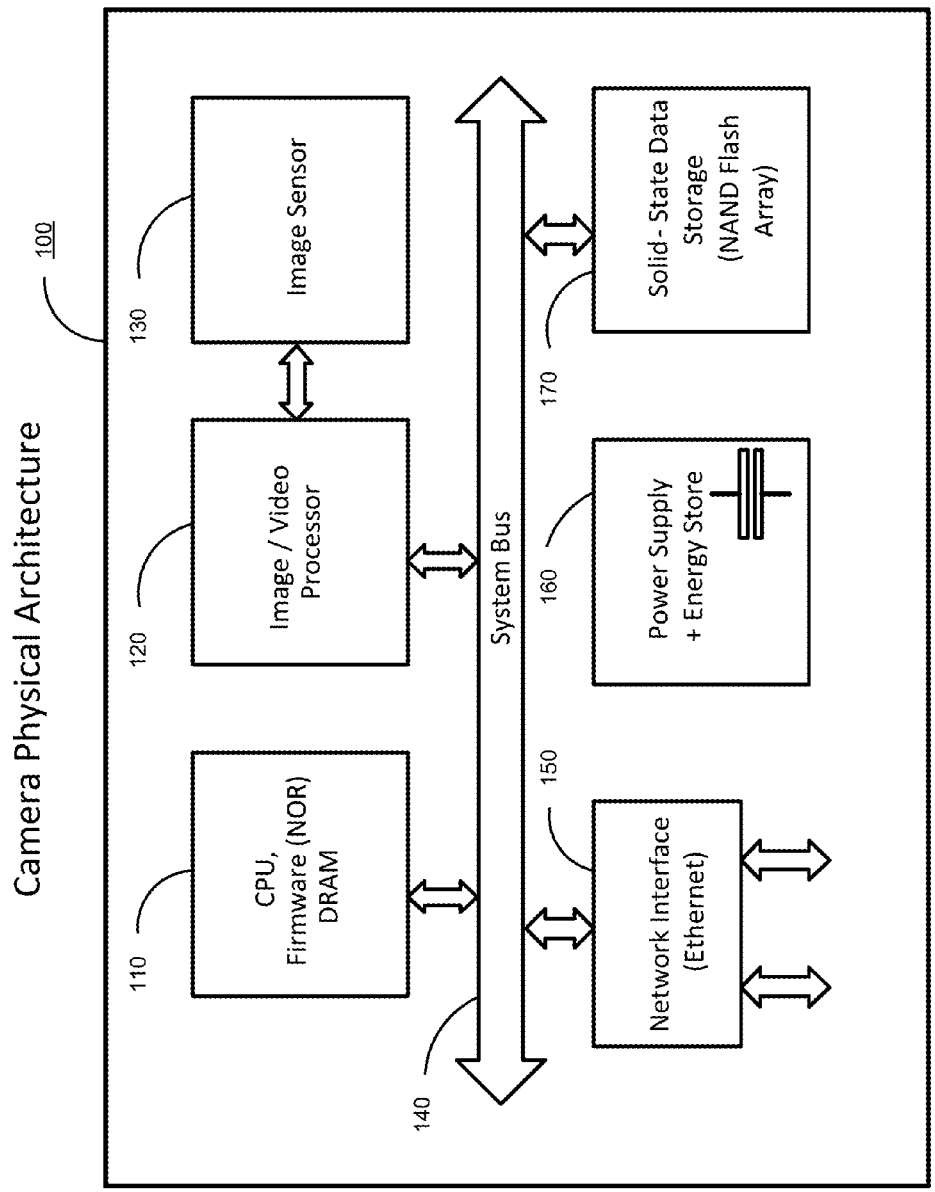
FIG. 1 illustrates an architecture of a video camera, in accordance with the exemplary embodiment.

Reference will now be made in detail to the preferred embodiments of the present invention, examples of which are illustrated in the accompanying drawings.

In one aspect, a network of digital video cameras is provided. Each camera records video data and provides the video recordings to other networked cameras, as well as to a central video storage. A digital video security system is formed of two primary elements—an IP camera including optics, an image sensor, a video processor and a network interface; and the NVR that contains a high-volume network interface, a digital data storage subsystem and a management software. Here, "high volume" refers to such network interfaces as Gigabit Ethernet or successors, and when referring to data storage, it would range from several TB (TeraByte) up to a thousand TB, although these numbers are expected to increase with time and technological advances. The volume of storage required is calculated by summing the bandwidth of all cameras and multiplying by the duration of time that the material needs to be maintained before it is overwritten by new data.

A security system also has the network core infrastructure components (e.g., network switches, cables) and human-interface devices (i.e., computer monitors) that, advantageously, do not require any modifications for the exemplary embodiment to be implemented. In one embodiment, a central NVR system is optional. Each IP camera is equipped with a certain amount of data storage media (e.g., solid-state NAND Flash memory array, magnetic media, such as hard disk drives, magnetic tape, etc.) that is sufficient in size to hold the recordings of several video cameras for several hours.

For example, a 1 Mbps (million bits per second) video stream compressed with contemporary standard (e.g., H.264) codec provides a very good video quality. A camera can be augmented by 6 GByte of NAND Flash storage at a minimal cost per camera. This would suffice to hold about 4.5 hours of recorded video streams from 3 cameras (i.e., from the main camera and from two network peers).

According to the exemplary embodiment, cameras communicate with each other over the network at all times. Each surveillance camera, in addition to storing its own recording, also receives and stores video streams from several additional cameras. Given that network can be built to support many thousands of such video streams traversing the network, the spread and location of such dynamic camera groupings can be arbitrary across the protected site as well as outside the confines of the site.

Note that the cameras are not just paired by twos. According to the exemplary embodiment, the video cameras are in dynamic association with each other. In other words, each camera dynamically selects a number of connected cameras to which it distributes duplicates of its own video footage. In one embodiment, each camera only uses one set of "peers" during one time interval and dynamically selects another set of "peers" for a subsequent time interval.

Reassembly of the video footage requires the retrieval of data stored in all accesible cameras, then merging the files by camera identifier and time stamp contained in each video stream fragment. The timestamp is used to eliminate duplicates and sort the fragments into a correct order for display. Regarding peer associations, in a small installation, all cameras will associate each other in a "mesh" topology, distributing the footage uniformly with several duplicates over the entire network. In a large installation, a full mesh may be less practical, so a partial mesh is formed by sub-groups of peers. The sub-groups can be dynamically formed in certain intervals of, e.g., 10-90 minutes. The regrouping interval may also be randomized for an additional degree of protection.

The implementation can use a proprietary implementation of standard file transfer and negotiation protocols or a single proprietary protocol that encompasses all required functions. By splitting the video stream into "fragments" where each fragment is a "group of pictures", and each "fragment" consists of between 1 to 10 seconds worth of video, then each "fragment" can be treated as a "file" that is transmitted over the network as a unit, and stored on the camera storage file system as a unit. The file name will have the ID of the camera that captured that fragment and a timestamp of the first frame in that fragment.

According to the exemplary embodiment, the video evidence of an incident can be eliminated only by destroying all such video cameras of a target site. Making these cameras small and easy to camouflage reduces the likelihood of such systematic elimination of recorded video data. Implementation of a storage using solid state component advantageously makes it much more difficult to destroy the data on these devices permanently.

A centralized recording and mass-storage equipment can be used for additional storage space that allows maintaining video recordings for longer than the amount of storage available in each camera (if long-term archiving is a required). Monitoring video stream in "real-time", as well as, accessing previously recorded material can be implemented directly by accessing one or more of the cameras over the network or by remotely accessing the centralized storage archive.

Figure 4:
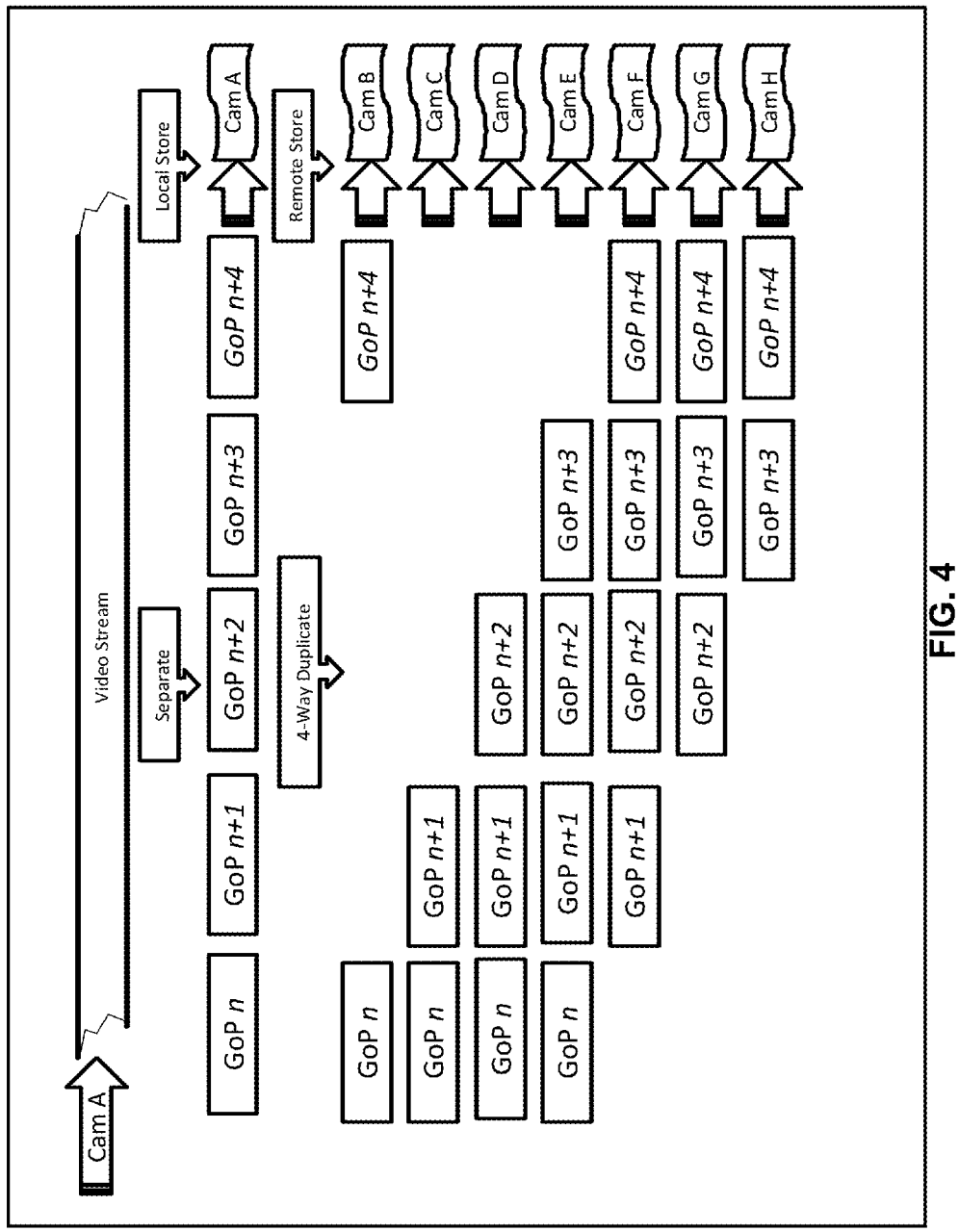
FIG. 4 illustrates an example of video footage distribution among multiple cameras.

According to yet another embodiment, each network camera is equipped with a small energy storage device (i.e., such as, for example, a rechargeable battery or a super-capacitor) so that the camera is able to continue recording into its own integrated storage in the event of a temporarily power loss. The network core elements can be equipped with some back-up power as well. Thus, recordings will continue to be distributed among the peer cameras in case of a power outage. FIG. 4, discussed below, shows an exemplary "multiplication and distribution" implementation, with the splitting of video into fragments each consisting of an integral number of GoPs (groups of pictures), so that every fragment can be viewed independently from any other fragments, or as a part of a properly ordered sequence of fragments. Optionally, each fragment can be protected with a cryptographic signature as a "unit of information", see U.S. Provisional Patent Application No. 60/739,780, filed Nov. 29, 2005, incorporated herein by reference in its entirety.

The exemplary embodiment can be implemented in wired, as well as in wireless data networks. A camera equipped with both a wired and a wireless network interfaces combines the advantages of both networking technologies and adds another substantial level of difficulty in breaching the surveillance network and destroying the video evidence it contains. The video network will greatly improve the ability of the surveillance systems to combat direct attacks on the video system itself that are becoming a part of the criminal activity these video systems are designed to prevent.

FIG. 1 illustrates architecture of a video camera 100, in accordance with the exemplary embodiment. The video camera has a processor 110, an image/video processor 120, an image sensor 130, a network interface 150, a power supply 160 and a solid-state data storage (NAND Flash array) 170. All of these elements are interconnected through a system bus 140.

Figure 2:
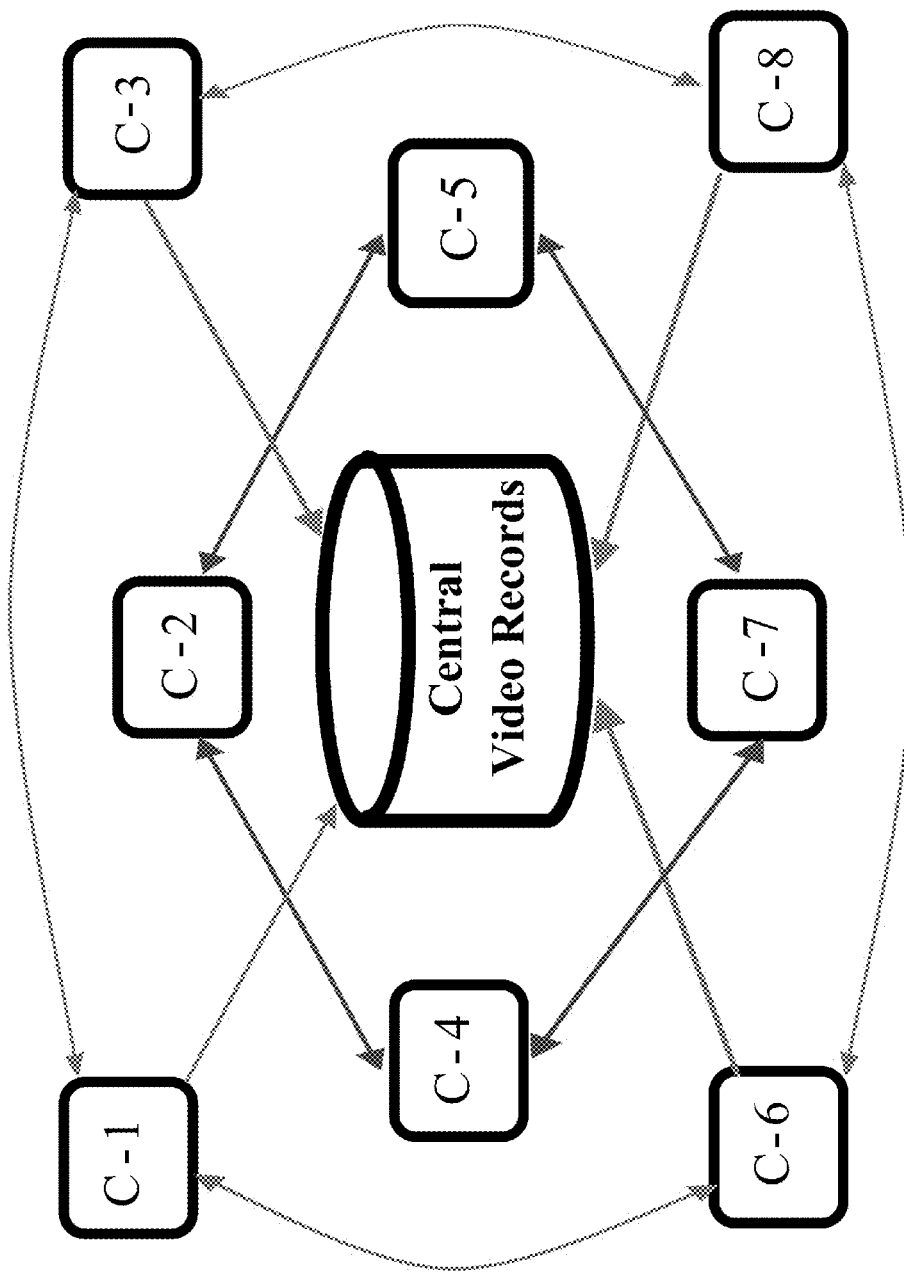
FIG. 2 illustrates a video camera network, in accordance with the exemplary embodiment.

FIG. 2 illustrates a video camera network, in accordance with the exemplary embodiment. The cameras, as the depicted in FIG. 1, are arranged into a network shown in FIG. 2. Note that this example shows eight cameras and a central storage. However, an arbitrary number of cameras and common storages can be connected into a network. In this example, camera C-1 acquires video data and stores it on its integrated storage device.

Camera C-1 simultaneously transmits acquired video data to its peers—cameras C-3 and C-6 that receive the video data and store it locally onto their integrated storages. Additionally, camera C-1 also transmits the copy of the acquired video data to a central storage. Thus, in this example, at least four copies of video data from the camera C-1 are created. Other cameras C-3, C-8 and C-6 serve as main nodes of a network. These nodes provide copies of acquired video stream to their respective peers and to the central storage. Other nodes (i.e., sub-nodes), such as cameras C-2, C-5, C-4 and C-7 provide their video data only to their peers. Alternatively, main nodes can receive video data from their peers and transfer it to the central storage, while storing a copy locally.

Figure 3:
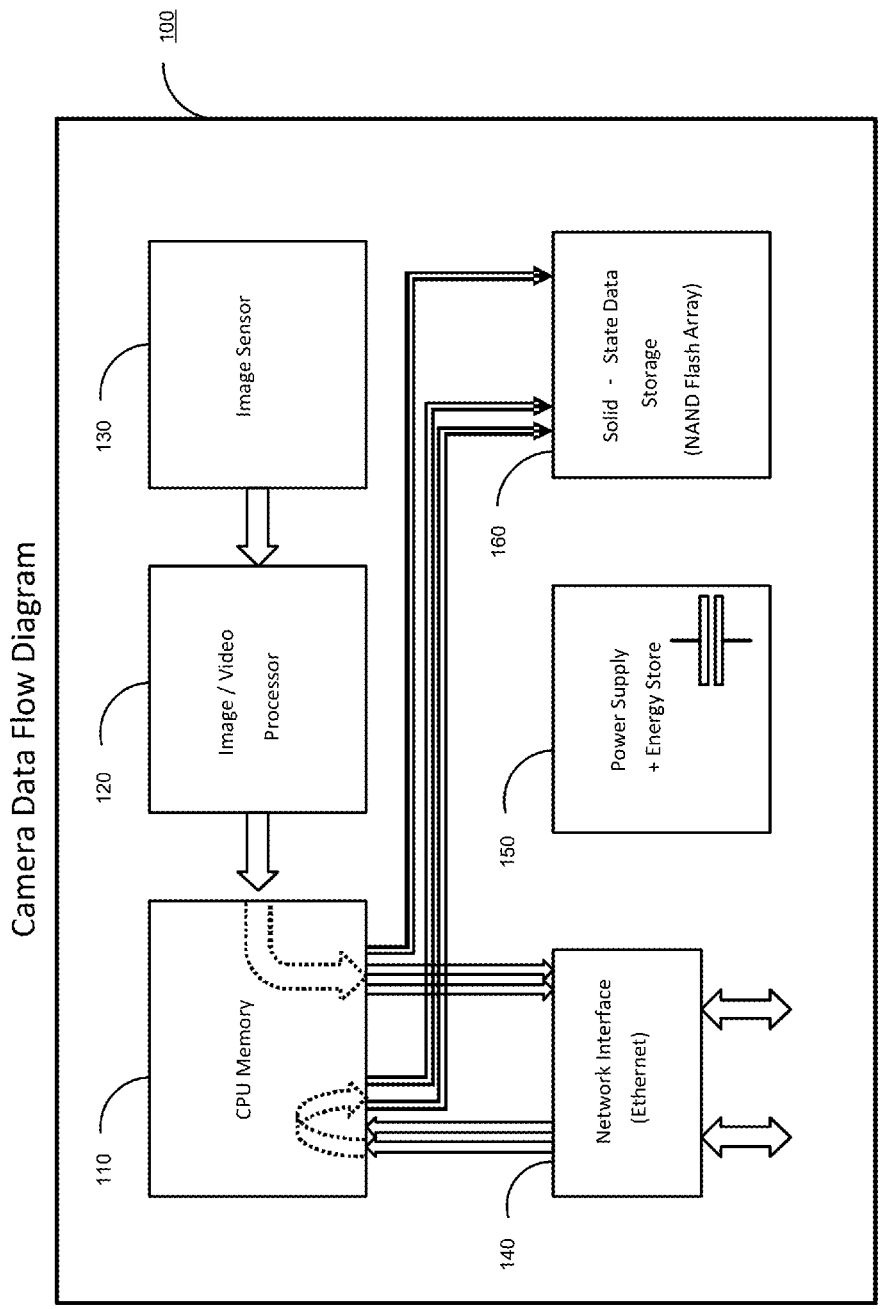
FIG. 3 illustrates a data flow diagram of an individual video camera, in accordance with the exemplary embodiment.

FIG. 3 illustrates a data flow diagram of an individual video camera, in accordance with the exemplary embodiment. The image/video processor 110 is a specialized processing element that acquires a continuous stream of images (i.e., frames) from the image sensor 130 located behind the camera lens. The processor 110 performs image enhancements, as well as compression of the images. The images can be either a sequence of standalone independent images (Motion-JPEG) or a sequence of independent images (MPEG "I"-frames) and dependent images ("B', "P" frames). The image/video processor 120 stores the resulting image sequences (i.e., video stream) into the main memory of CPU 110.

The CPU 110 concurrently stores the resulting stream into the integral NAND Flash memory 160 and transmits several copies of the same stream to several cameras attached to the same local area network via network interface 140. At the same time, the CPU 110 receives the incoming data streams from the other cameras on the network via the network interface 140 and proceeds to store the received streams onto its integrated NAND Flash storage 160. A "GoP" can be viewed as analogous to a "fragment" of a video stream, and in turn analogous to a "file" that has a name, begins with a header and optionally a cryptographic signature for authenticating the fragment and protect it from tampering. The oldest files can be deleted to make room for new files to be stored, as required by incoming data and space availability.

In FIG. 1, the time-fragment is shown as containing a single Group-of-pictures (GoP), for clear illustration, although in other embodiments, a time-fragment may contain multiple integral Groups-of-pictures.

Video Data Management

The acquired video data needs to be first segmented into fragments, each representing a period of time between a few seconds to several minutes. This initial segmentation is necessary to facilitate reasonable management of the acquired video footage, as a collection of files in a file system.

In the preferred embodiment, the video signal is first compressed using one of several video compression formats, such as MPEG-1, MPEG-2 or MPEG-4. This reduces the amount of storage required for the footage by recording the video as a sequence of picture groups, where each group consists of a single independent-frame, and followed by a number of frames that depend on the preceding independent frame, and optionally on some of the subsequent dependent frames. In this preferred embodiment the data generated by the video encoding module is then segmented into time-fragments, each consisting of an integral number of groups of pictures, such that each time-fragment starts with an independent frame, and hence can be displayed independently of other time-fragments. In this embodiment, each time-fragment is stored as a single file, onto a file system implemented with the camera embedded storage.

Each of these files shall also contain at least one signature that can be used to verify the integrity of the data contained within each file. In a preferred embodiment, such a signature shall be computed using a cryptographic hash algorithm (for example SHA-1 or SHA-2), that, in addition to verifying data integrity, can be used to reliably authenticate the data, in a way that is difficult to forge. Such a preferred embodiment where each file containing a cryptographically authenticated time-fragment of the acquired video can be valuable for prosecution evidence, where the signature is used as proof for the authenticity of each video fragment.

In another alternative embodiment, the video is compressed using an algorithm that preserves the independence of each video frame with respect to other video frame, such as Motion-JPEG (MJPEG). Time-fragments may contain an arbitrary number of frames, and may begin and end at arbitrary points of time, because the use of frame-independent video compression allows displaying the video of each frame independently from each other. The MJPEG-based embodiment is inferior to the MPEG-based embodiment due to higher storage space requirement for the same video footage. An embodiment using compression similar to MJPEG should attach at least one integrity signature to every time-fragment, or to any subset thereof consisting of an arbitrary number of frames, or even to partial frames.

When a file is stored on a file system embedded within the camera, the file system and its underlying storage media implements an integrity check signature for each data block of a fixed size. In one embodiment, such integrity checks embedded in the media may be sufficient, but a cryptographic hash signature is advantageous for several reasons: first, the signature as part of the file will accompany that file whenever it is copied to another media (e.g., to another camera or to some external storage), whereas the integrity checks embedded within the storage media do not; secondly, a strong cryptographic signature makes the video useful not just for investigative purposes, but can prove material in the evidentiary procedures in many jurisdictions, and will help in the acceptance of such video footage into evidence.

Each video time-fragment, contained within a file and accompanies with a secure signature should be assigned a name that is generated from: (a) camera identifier; (b) the time and date of its first frame, such that by sorting the file listing by name will result in a chronologically-sorted sequence of time-fragments, with all fragments generated by a specific camera grouped together.

The process of replicating the video footage is essentially based on the video time-segment and file generation process described above. Moreover, the process of replicating the video footage to peer cameras is accomplished by transmitting the content and names of the files stored in the camera's embedded storage to select peer cameras, and ultimately storing of such files within the file system implemented within each of the peer cameras. The security hash signature contained within each file will be thus copied in multiple replicas along with the video time-fragments.

When the embedded storage of a camera becomes full, the camera software will delete the oldest files, thus making room for additional locally-acquired file to be stored, and for additional files to be received from peer cameras and stored locally.

FIG. 4 illustrates an example of video footage distribution among multiple cameras on a network. The video stream acquired by camera A is first split into a sequence of "group of pictures"—GoPn. Each GoPn is a sequence of frames/fields beginning with an "independent" frame and followed by an optional sequence of "dependent" frames. Depending on a video compression algorithm and parameters of a GoPn, it may represent between 0.5 to 5 seconds footage section (according to MPEG protocol).

As shown in FIG. 4, the original stream is stored locally on the camera's A integrated storage. In the example depicted in FIG. 4, four copies (from GoPn+1 to GoPn+4) of the original stream from camera A are generated. Then, these streams are distributed among the other 7 cameras (see CamB-CamH). The "GoP" sequence is distributed over the network to all the other cameras uniformly.

As a result, five complete copies of the footage are stored on the entire network. The source camera A stores a complete copy, while each of the remaining cameras stores a partial copy such that a complete copy can be salvaged in the event that several cameras are destroyed. For example, if CamA is destroyed, any three of the other seven cameras will suffice to reconstruct CamA video footage in its entirety. The significance of GoP is in the ability to decode and display a portion of video footage independently in the event that only a partial copy of the footage of CamA can be salvaged.

Those skilled in the art will appreciate that the exemplary embodiment, advantageously, provides for effective storage and protection of surveillance video recordings. If any single camera of the network if eliminated (stolen or destroyed), the video evidence will not be completely lost due to the plurality of copies of the same footage that have been distributed over network connected cameras. A probability of salvaging at least one copy is extremely high. Increasing a number of network cameras (i.e., a number of copies of video data) will increase the probability of survival of video evidence.

Those skilled in the art will also appreciate that making the duplication scheme highly dynamic makes it impossible for an attacker to predict the physical location of all duplicates (i.e., video copies) of video evidence of the attack. It is also almost impossible for an attacker to figure out the specific cameras that need to be destroyed. It can be illustrated by a following example.

A given site is equipped with 100 cameras, each operating at 30 frames per second. The footage is then "multiplied" by a factor of 4, resulting in each camera generating 120 frames per second. All frames are uniformly distributed to all cameras, such that each camera will store 1.2 frames from each of the cameras (including itself). Then, even if ¾ of all cameras are destroyed (leaving only 25 cameras), by retrieving all the data in the remaining 25 cameras and combining it together, 30 video frames (120/4=30) will be available for every recording second from each of the original cameras.

The computer connected to the LAN may interact and retrieve files from any or all of the recording-cameras connected to that network. Whereas each file contains a "fragment" of video captured by the given camera or one of the other cameras on the network, the general purpose computer may retrieve all files from several cameras, then proceed to sort the files by camera-ID and time-stamp to eliminate duplicate fragments and splice the fragment into a chronologically correct video stream, and display the video stream on the display, or copy the footage to any of its connected fixed or removable media types. Such copies may be needed for off-site archival or for provision of copies to law enforcement or other agencies for the purpose of investigation or evidence. The central digital video recorded is a computer similar to what is shown in FIG. 5, connected to the LAN to monitor the proper operation of cameras and any other equipment that is part of the security network, and generate alerts to the attendant in case of a technical malfunction or a potential incident requiring human attention.

Figure 6:
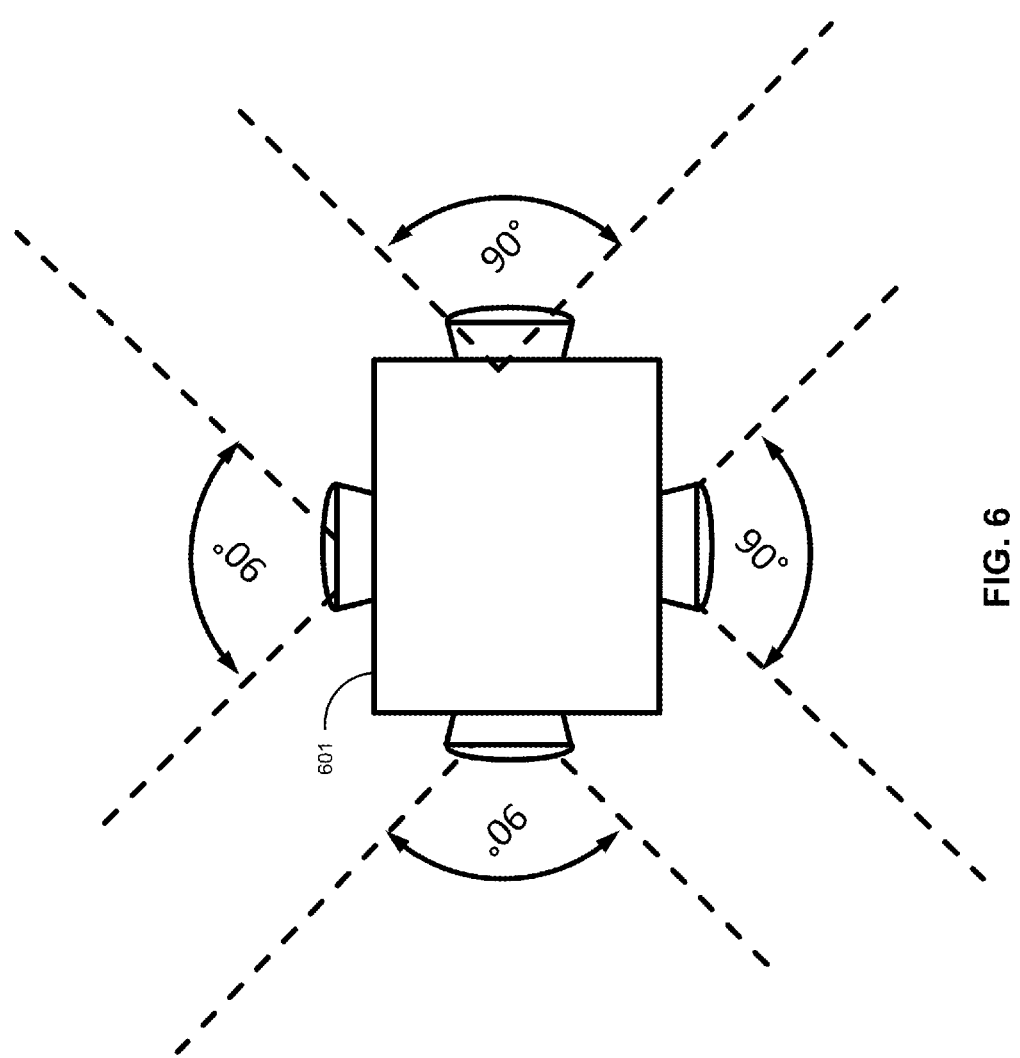
FIGS. 6-7 illustrate an alternative embodiment of a video camera utilizing multiple lenses, that may be used in the present invention.
Figure 7:
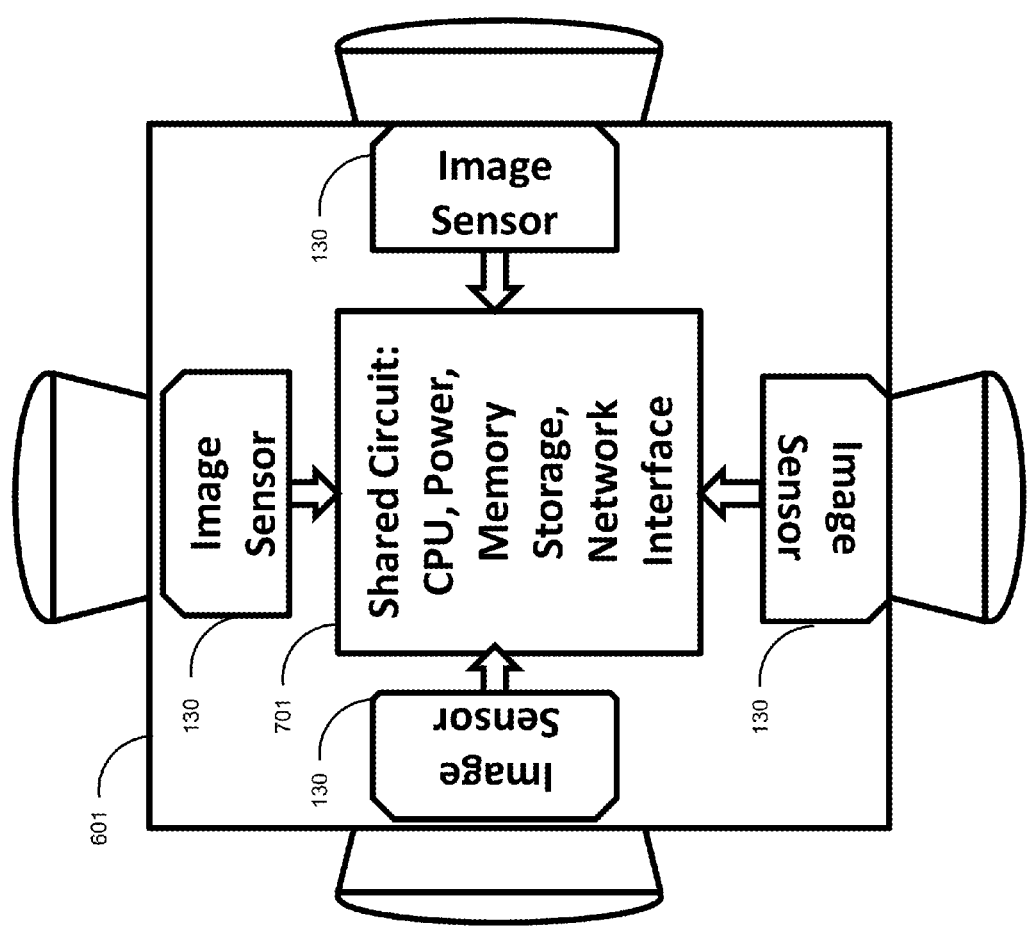

FIGS. 6-7 illustrate an alternative embodiment of a video camera utilizing multiple lenses, that may be used in the present invention. As shown in FIGS. 6-7, a single camera may employ multiple lenses, having different spatial orientation. Each lens has its own image sensor, such as a CCD array, but all the lenses and image sensors share the same CPU, network interface hardware, image processing circuitry, etc. Thus, using a single camera, a much larger area can be covered, at relatively low cost. FIGS. 6-7 show an example of a 4-lens camera covering 360 degrees of horizontal field of view combined, although the number of lenses may vary. For example, for higher resolution, each lens can have a smaller view field, but more lens+image sensor combinations would be needed to cover 360 degrees (for example, up to 8 lenses). Sometimes (e.g., an in-vehicle camera) a panoramic view may not be necessary, thus fewer lenses may be used (e.g., 2 lenses: one forward, one backwards). An additional example (not shown in the figures) is a "blind" camera, with all the same components but no lens and no image sensor, which can be used as a distributed data storage unit that participates in the "peer-to-peer" relationship with other cameras on the network, but does not generate any images of its own (i.e., a zero-lens example).

As will be appreciated, both peer-to-peer distributed architecture principles and client-server (a.k.a. master-slave) architecture, can be used. Protocols designed in accordance to the "client-server" principle are deemed asymmetric, i.e. all communicating entities have to implement either the "client" role or the "server" role at any given time, and usually the nodes that have the initiative are deemed clients, whereas servers merely respond to requests initiated by a client. In contrast, the peer-to-peer principle defines that all entities are functionally symmetrical, and are allowed to initiate operations, while at the same time are expected to respond to operations initiated by other peers. This is not to mean that all peers in a distributed system must be identical in their functionality and implementation, as any compliant peer may partially implement the protocol or distributed application. Another way to understand the peer-to-peer architecture is to define each entity to be both a client and a server, at the same time. The practical application of this principle to the exemplary embodiment is that each camera functions as a client, and initiates a data transfer operation at the rate that its image processor quires video frames, and directs these operations at other peer cameras as well as to the centralized storage; while at the same time, each camera also functions as a server and should respond to the data transfer requests from other cameras—accept the transferred video data and commit it to its locally embedded storage.

Figure 5:
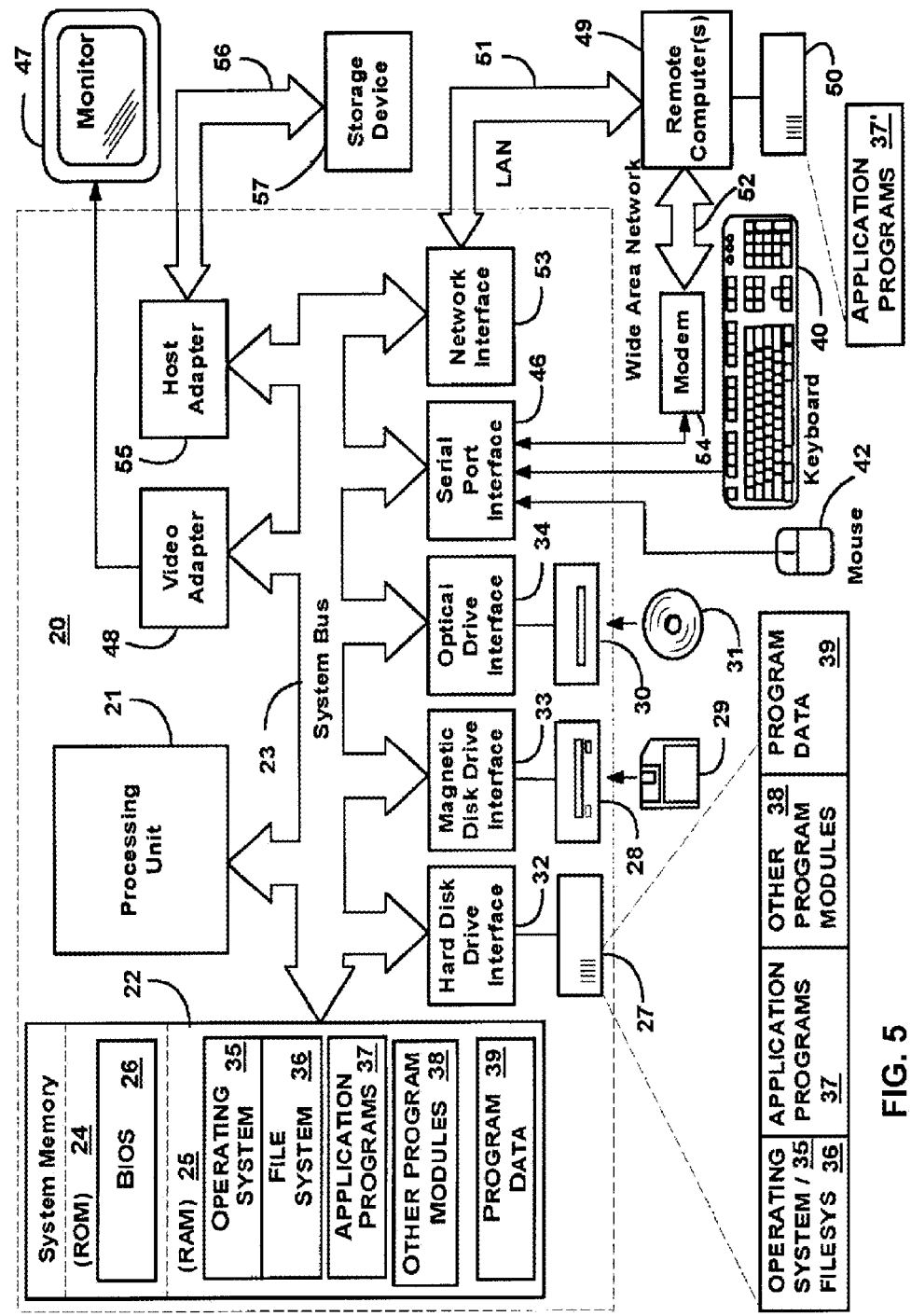
FIG. 5 illustrates a schematic of an exemplary computer system or server that can be used for implementation of the invention.

With reference to FIG. 5, an exemplary system used in the invention includes a general purpose computing device in the form of a computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective detection and prevention of computer virus-related epidemics.

It should also be appreciated that various modifications, adaptations and alternative embodiments thereof may be made within the scope and spirit of the present invention. The invention is further defined by the following claims.

What is claimed is:

1. A surveillance video system, the system comprising:
  a CPU connected to a network interface;
  an image processor connected to the CPU;
  an image sensor coupled to the image processor; and
  a solid-state data storage accessible by the CPU,
  wherein the CPU, the network interface, the image sensor and the solid-state data storage are integrated into a single assembly, and
  wherein:
    the image processor processes continuous stream of images from the image sensor and provides the images to the CPU,
    the CPU stores the images received from the image sensor along with a timestamp on the solid-state data storage as part of a file system of the camera,
    the CPU receives images via the network interface from peer cameras connected over a network, and stores the images, together with their timestamps, on the solid-state data storage as part of the file system of the camera,
    wherein the CPU sends replicas of the images from the image processor to the peer cameras, such that each peer camera acts simultaneously as a server and as a client,
    wherein the stream of images is recoverable from multiple cameras, and
    wherein the stream of images is split into time segments and each time segment is assigned a security signature.

2. The system of claim 1, wherein the solid-state data storage is NAND flash array.

3. The system of claim 1, wherein the image processor performs image enhancement and compression.

4. The system of claim 1, further comprising a system bus used to communicate between the solid-state storage, the CPU and the image processor.

5. The system of claim 1, wherein the CPU receives the images from the image processor and sends them to other cameras via the network interface.

6. The system of claim 1, wherein the CPU receives the images from the image processor and sends them to a central storage via the network interface.

7. The system of claim 1, wherein the CPU receives the images from the other cameras and sends them to a central storage.

8. A surveillance video network, the network comprising:
a plurality of video cameras connected into a peer-to-peer network; and
a central video storage,
wherein:
each camera acquires timestamped video data and stores it locally,
each camera provides a replica of the timestamped video data to at least one peer-camera connected to the peer-to-peer network, wherein each peer-camera stores the copy of the timestamped video data locally as part of its file system,
each camera acts simultaneously as a server and as a client, wherein the video data is recoverable from multiple cameras, and
wherein the video data is split into time segments and each time segment is assigned a security signature.

9. The video network of claim 8, wherein each camera has a network interface.

10. The video network of claim 8, wherein each camera has an integrated solid-state data storage.

11. The video network of claim 8, wherein each camera performs compression of the video data prior to transmitting it.

12. The video network of claim 8, further comprising a central storage, wherein each camera sends a copy of the video data to the central video storage.

13. The video network of claim 12, wherein only node cameras are connected to the central storage.

14. The video network of claim 13, wherein sub-node cameras provide the video data to the node cameras.

15. The video network of claim 13, wherein the sub-node cameras store partial video data received from the node cameras.

16. The video network of claim 14, wherein at least some of the cameras have multiple lenses covering different views, but lenses of the same camera share the same CPU, memory and network interface hardware.

17. A surveillance video system, the system comprising:
a camera including a CPU, an image processor, an image sensor coupled to the image processor, and a magnetic data storage,
wherein:
the image processor processes a stream of images from the image sensor and provides the images to the CPU, together with their timestamps,
the CPU stores the images and their timestamps on the magnetic data storage as part of the file system of the camera,
the CPU receives images, together with their timestamps from peer cameras connected over a network, and stores the images on the magnetic data storage,
the CPU sends replicas of the images from the image processor to the peer cameras, such that each peer camera acts simultaneously as a server and as a client,
wherein the stream of images is recoverable from multiple cameras, and
wherein the stream of images is split into time segments and each time segment is assigned a security signature.

* * * * *